United States Patent
Sudo et al.

(10) Patent No.: US 8,767,353 B2
(45) Date of Patent: Jul. 1, 2014

(54) LOW PROFILE DAMPER PLATES FOR A YOKE OF A VOICE COIL MOTOR

(75) Inventors: Kimihiko Sudo, Kanagawa (JP); Kouki Uefune, Kanagawa (JP); Hiromitsu Masuda, Kanagawa (JP); Takako Hayakawa, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 173 days.

(21) Appl. No.: 12/980,125

(22) Filed: Dec. 28, 2010

(65) Prior Publication Data

US 2012/0162826 A1 Jun. 28, 2012

(51) Int. Cl.
*G11B 5/55* (2006.01)
*G11B 33/14* (2006.01)

(52) U.S. Cl.
USPC ........................................ 360/264.7

(58) Field of Classification Search
USPC .................... 360/264.7–264.9, 265
See application file for complete search history.

(56) References Cited

U.S. PATENT DOCUMENTS

| | | | | |
|---|---|---|---|---|
| 5,486,965 A * | 1/1996 | Yoshida et al. | ............... | 360/265 |
| 5,583,724 A * | 12/1996 | Kim et al. | .................. | 360/256.2 |
| 5,790,348 A * | 8/1998 | Alfred et al. | ................. | 360/265 |
| 5,914,836 A * | 6/1999 | Pottebaum | ................. | 360/264.8 |
| 5,999,374 A | 12/1999 | Kim | | |
| 6,091,579 A * | 7/2000 | Suzuki | ........................ | 360/264.8 |
| 6,175,469 B1 * | 1/2001 | Ahmad et al. | ............... | 360/97.2 |
| 6,512,658 B1 | 1/2003 | Jierapipatanakul et al. | | |
| 6,549,381 B1 * | 4/2003 | Watson | ....................... | 360/264.9 |
| 6,608,732 B2 * | 8/2003 | Bernett et al. | ............. | 360/99.16 |
| 6,724,566 B2 | 4/2004 | Kant et al. | | |
| 6,937,444 B1 * | 8/2005 | Oveyssi | ..................... | 360/265.8 |
| 6,952,323 B2 * | 10/2005 | Hirasaka et al. | ........... | 360/99.18 |
| 7,082,014 B2 * | 7/2006 | Kim | .......................... | 360/256.2 |
| 7,375,928 B2 | 5/2008 | Kim | | |
| 7,529,062 B2 | 5/2009 | Xu | | |
| 7,564,645 B2 * | 7/2009 | Tsuda et al. | ............... | 360/97.19 |
| 7,675,714 B1 * | 3/2010 | Yucesan et al. | ........... | 360/265.8 |
| 7,848,058 B2 * | 12/2010 | Huang et al. | ............... | 360/265.8 |
| 7,929,245 B2 * | 4/2011 | Hanrahan | .................. | 360/97.19 |
| 7,990,657 B2 * | 8/2011 | Fu et al. | ..................... | 360/264.7 |
| 8,068,309 B2 * | 11/2011 | MacKinnon et al. | ...... | 360/97.19 |
| 2005/0099734 A1 * | 5/2005 | Rafaelof | ..................... | 360/264.8 |
| 2006/0221505 A1 * | 10/2006 | Fujimoto et al. | ........... | 360/264.7 |
| 2007/0115592 A1 * | 5/2007 | Kim et al. | .................. | 360/264.3 |
| 2008/0310054 A1 | 12/2008 | Fu et al. | | |
| 2009/0059435 A1 | 3/2009 | Huang et al. | | |
| 2009/0161258 A1 | 6/2009 | Nakamura | | |

FOREIGN PATENT DOCUMENTS

GB 2326968 1/1999

OTHER PUBLICATIONS

Blount, Walker C., "Noise Reduction Using Dampening in Voice Coil Motors/Actuators of Hard Disk Drives", http://www1.hitachigst.com/hdd/library/noise.pdf, (Oct. 2001),1-6.

* cited by examiner

*Primary Examiner* — Brian Miller

(57) ABSTRACT

A hard disk drive including a plurality of magnetic disks and a voice coil motor. The voice coil motor includes a coil and a first damper plate for dampening vibrations generated by the coil. The first damper plate is disposed within the voice coil motor.

9 Claims, 11 Drawing Sheets

LOW PROFILE DAMPER PLATES FOR A YOKE OF A VOICE COIL MOTOR

BACKGROUND

It is a goal to provide large-capacity magnetic disk devices or hard disk drives (HDDs). One way to do this is to provide a greater number of magnetic disks. However, it also a goal to provide narrower or slimmer HDDs. Accordingly, when there are a greater number of magnetic disks, there are also more actuator arms. As a result, the mass of actuators increases. Consequently, the reaction force produced in a top yoke and bottom yoke of a voice coil motor (VCM) by the actuator coils is further increased during reading/writing. This reaction force causes the top yoke and bottom yoke to vibrate, while also causing the device itself to vibrate.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

As described above, it is a goal to provide large-capacity magnetic disk devices or hard disk drives (HDDs). One way to do this is to provide a greater number of magnetic disks. However, it also a goal to provide narrower or slimmer HDDs. Accordingly, when there are a greater number of magnetic disks, there are also more actuator arms. As a result, the mass of actuators increases. Consequently, the reaction force produced in a top yoke and bottom yoke of a voice coil motor (VCM) by the actuator coils is further increased during reading/writing. This reaction force causes the top yoke and bottom yoke to vibrate, while also causing the device itself to vibrate.

In various embodiments, vibrations of an HDD are reduced, while the HDD can also be made slimmer.

In one embodiment, a damper plate is provided at least on the surface of the top yoke facing the actuator coil in order to reduce vibration of the HDD. Accordingly, the thickness of the HDD is reduced.

Figure 1:
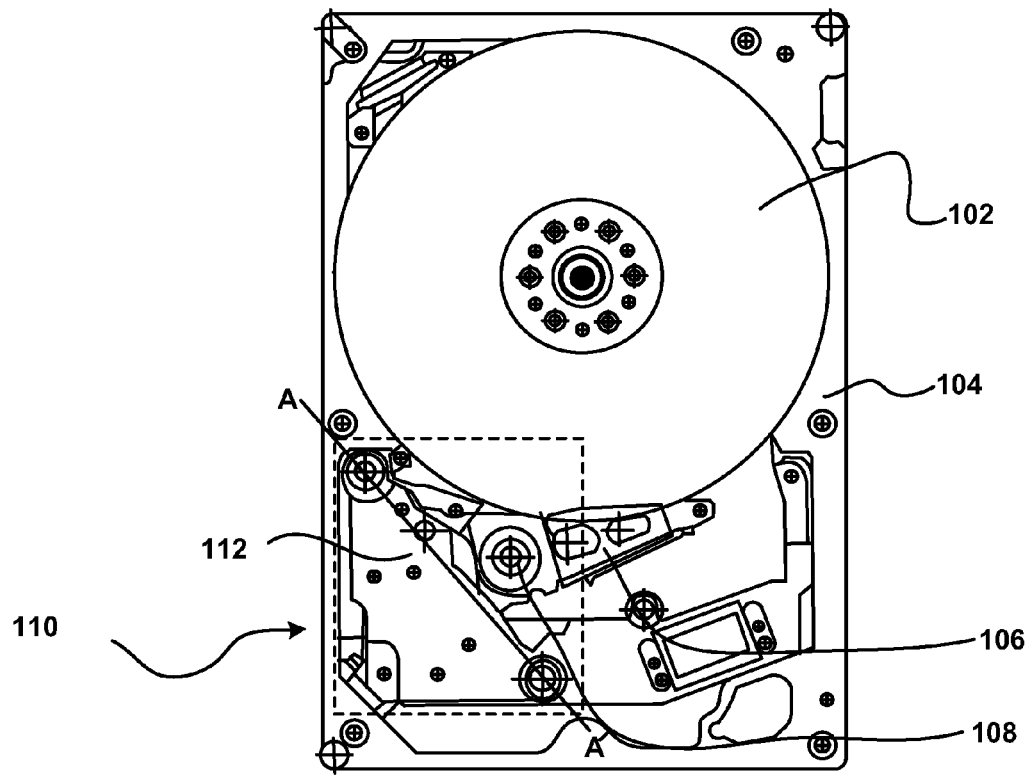
FIG. 1 illustrates an embodiment of a HDD.

FIG. 1 depicts an embodiment of HDD 100. HDD 100 includes magnetic disk pack 102, base 104, actuator 106, pivot 108, VCM 110 and top yoke 112.

Disk pack 102 includes a plurality of magnetic disks. In one embodiment, disk pack 102 includes at least three magnetic disks. Actuator 106 is associated with the top disk in disk pack 102. Moreover, a plurality of other actuators (not shown) are associated with the plurality of other disks in disk pack 102.

Figure 2:
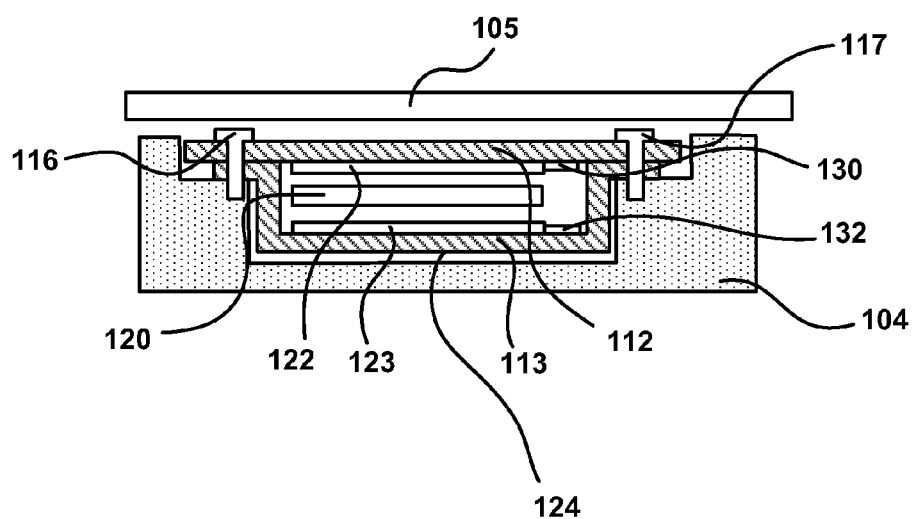
FIGS. 2 and 8 illustrate embodiments of a side-view of a HDD.

FIG. 2 depicts a cross-section along A-A' in FIG. 1. FIG. 2 depicts base 104, top cover 105, top yoke 112, bottom yoke 113, screws 116 and 117, actuator coil 120, first magnet 122, second magnet 123, first damper plate 130 and second damper plate 132.

Top cover 105 is hermetically sealed to base 104 such that contaminants do not enter HDD 100 and negatively affect the performance of HDD 100.

Top yoke 112 and bottom yoke 113 are attached together via screws 116 and 117. Moreover, the combination of top yoke 112 and bottom yoke 113 are attached to base 104 via screws 116 and 117. In one embodiment, a space 124 is provided between bottom yoke 113 and base 104. In another embodiment, there is no space between bottom yoke 113 and base 104.

It should be appreciated that other fastening means may be used instead of screws 116 and 117. Also, other screws or fastening means may be used in addition to screws 116 and 117.

Actuator coil 120 is positioned between top yoke 112 and bottom yoke 113. Actuator 106 is designed to be rotated (via actuator coil 120) about a pivot 108 by means of the magnetic force of first magnet 122 and second magnet 123. It should be appreciated that actuator coil 120 generates vibrations to VCM 100 (in particular top yoke 112 and bottom yoke 113) that negatively affect the performance of HDD 100.

First damper plate 130 and second damper plate 132 are for reducing the vibrations generated by actuator coil 120. First damper plate 130 and second damper plate 132 are disposed inside the VCM 110. In particular, first damper plate 130 is disposed on a surface (e.g., bottom surface) of top yoke 112 that faces actuator coil 120. Similarly, second damper plate 132 is disposed on a surface (e.g., top surface) of bottom yoke 113 that faces actuator coil 120. As a result, the space between top yoke 112 and top cover 105, and the space between bottom yoke 113 and base 104 can be reduced. Therefore, the thickness of HDD 100 is reduced.

First damper plate 130 increases the stiffness of top yoke 112 and second damper 132 increases the stiffness of bottom yoke 113. Therefore, vibrations of HDD 100, and, in particular, VCM 110 are reduced.

Figure 3:
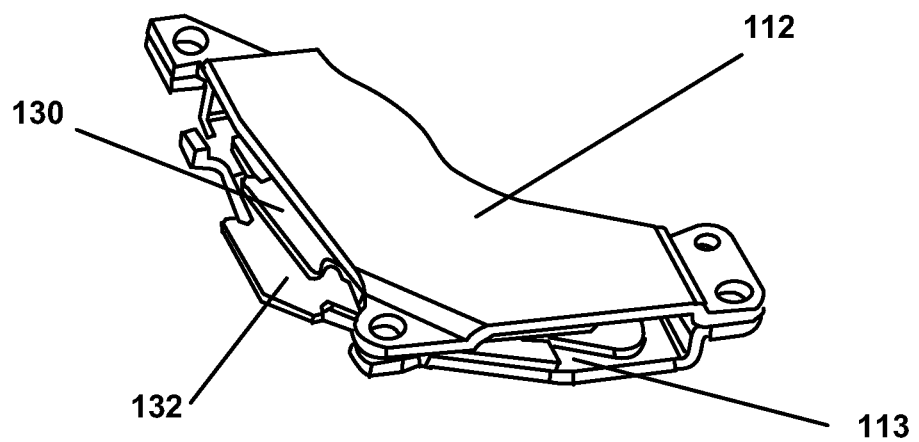
FIGS. 3 and 4 illustrate embodiments an isometric view of a top and bottom yoke.

FIG. 3 depicts an isometric view of first damper plate 130 and second damper plate 132 disposed on top yoke 112 and bottom yoke 113, respectively.

Figure 4:
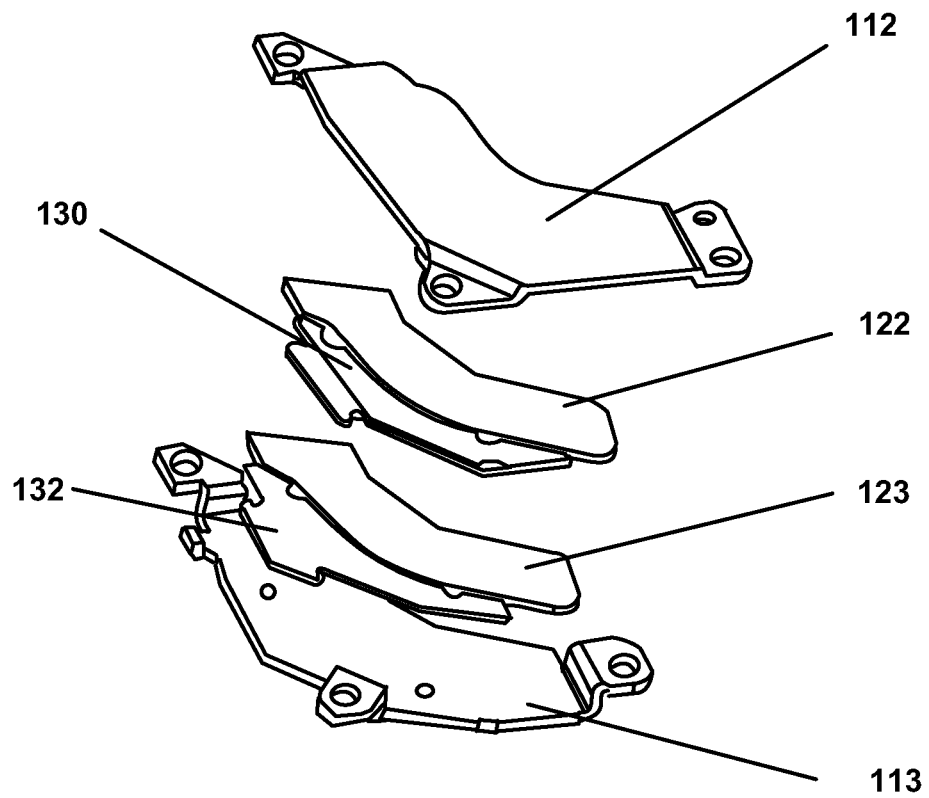

FIG. 4 is an embodiment of an exploded view of FIG. 3. First damper plate 130 is disposed adjacent first magnet 122. In particular, first damper plate 130 is disposed closer to the periphery of HDD 100 than first magnet 122. Similarly, second damper plate 132 is disposed adjacent second magnet 123. In particular, second damper plate 132 is disposed closer to the periphery of HDD 100 than second magnet 123.

Figure 5A:
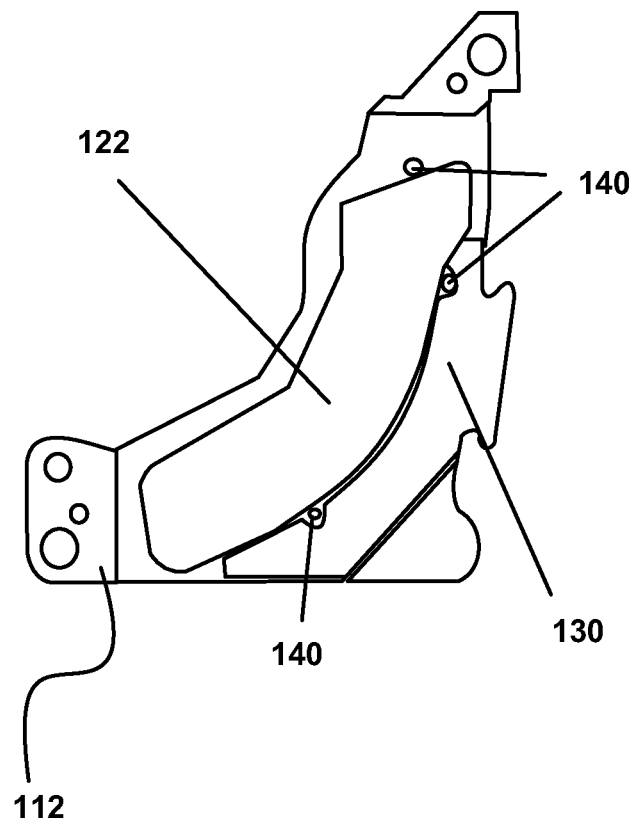
FIG. 5A illustrates an embodiment of a top yoke.

FIG. 5A depicts top yoke 112, first magnet 122, first damper plate 130 and projections 140. Projections 140 are for positioning first magnet 122 and first damper plate 130 with respect to top yoke 112.

Figure 5B:
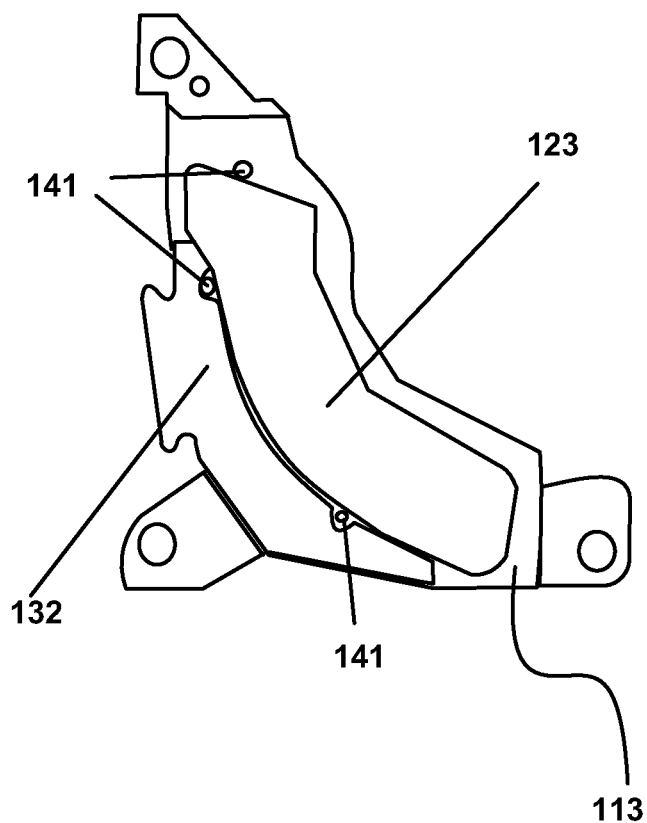
FIG. 5B illustrates an embodiment of a bottom yoke.

FIG. 5B depicts bottom yoke 113, second damper plate 132, second magnet 123 and projections 141. Projections 141 are for positioning second magnet 123 and second damper plate 132 with respect to bottom yoke 113

First magnet 122 and second magnet 123 are disposed in such a way as to press against the projections 140 and 141, respectively.

Furthermore, first damper plate 130 and second damper plate 132 are disposed further from pivot 108 than first magnet 122 and second magnet 123, respectively. In other words, first damper plate 130 and second damper plate 132 are provided at the end of base 104 on the near side from top yoke 112 and first magnet 122 and second magnet 123 are provided on the side which is closer to pivot 108.

Figure 6A:
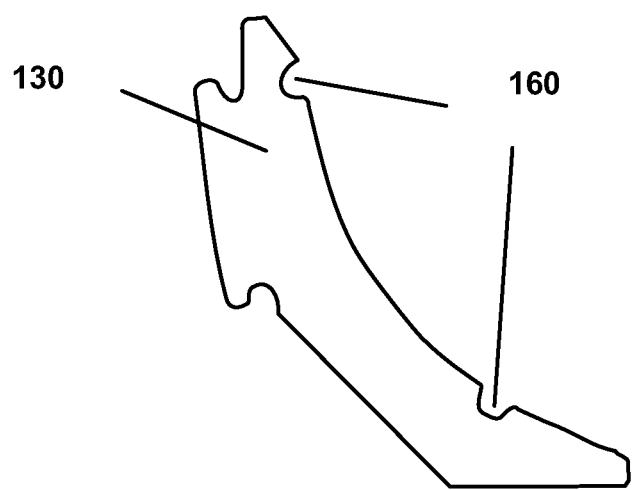
FIGS. 6A and B illustrate embodiments of a first damper plate.
Figure 6B:
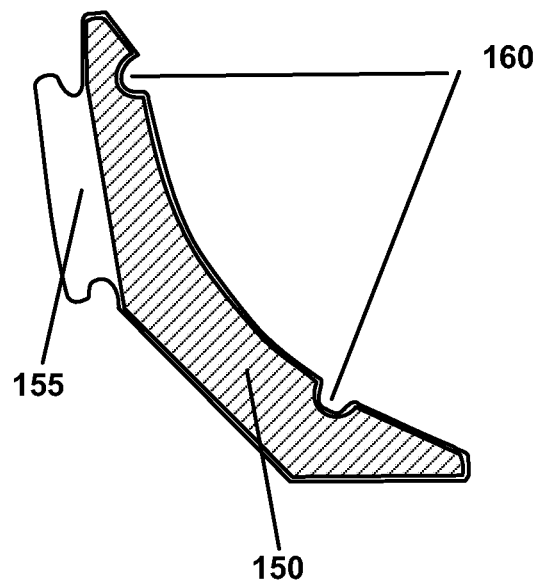

FIGS. 6A and B depict embodiments of first damper plate 130. In one embodiment, first damper plate 130 comprises a coated part 150 which is coated with adhesive (e.g., double-sided adhesive tape with low outgas, acrylic adhesive of thickness 0.05 mm, etc), a hook part 155 which is provided in such a way as to jut out from the outermost periphery of top yoke 112. Hook part 155 can be used to facilitate in manually maneuvering the placement of top yoke 112. For example, a grasping device (e.g., tweezers) can grasp onto hook part 155 and because first damper plate 130 is attached to top yoke 112, both top yoke 112 and first damper plate 130 can be manually maneuvered.

Circular cutaways 160 are slightly larger in diameter than projections 140. First damper plate 130 is disposed in a position such that circular cutaways 160 and projections 140 are concentric.

Figure 7A:
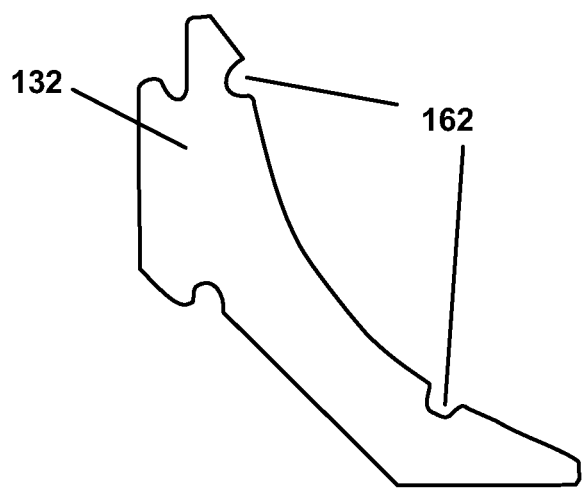
FIGS. 7A and B illustrate embodiments of a second damper plate.
Figure 7B:
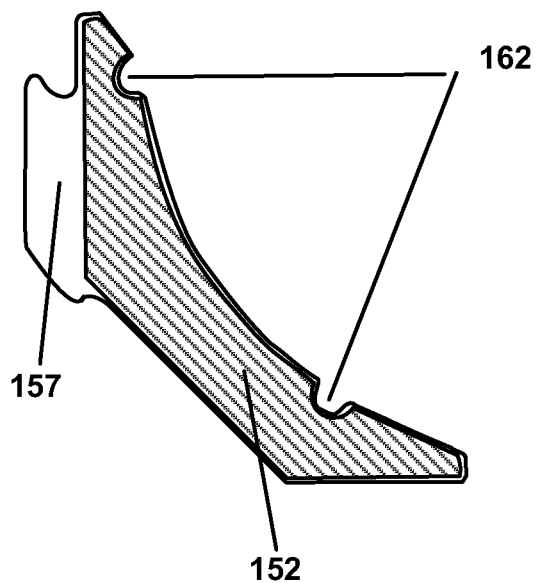

FIGS. 7A and B depict embodiments of second damper plate 132. In one embodiment, second damper plate 132 comprises a coated part 152 which is coated with adhesive (e.g., double-sided adhesive tape with low outgas, acrylic adhesive of thickness 0.05 mm, etc), a hook part 157 which is provided in such a way as to jut out from the outermost periphery of bottom yoke 113. Hook part 157 can be used to facilitate in manually maneuvering the placement of bottom yoke 113. For example, a grasping device (e.g., tweezers) can grasp onto hook part 157 and because second damper plate 132 is attached to bottom yoke 113, both bottom yoke 113 and second damper plate 132 can be manually maneuvered.

Circular cutaways 162 are slightly larger in diameter than projections 141. Second damper plate 132 is disposed in a position such that circular cutaways 162 and projections 141 are concentric.

First damper plate 130 and second damper plate 132 are rigid. In one embodiment, first damper plate 130 and second damper plate 132 are formed from a material which is more rigid than aluminum (e.g., stainless steel plate of thickness 0.5 mm).

In one embodiment, only first damper plate 130 is provided when bottom yoke 113 is fixed to base 104 and bottom yoke 113 and base 104 are in contact without a space 124 therebetween.

Figure 8:
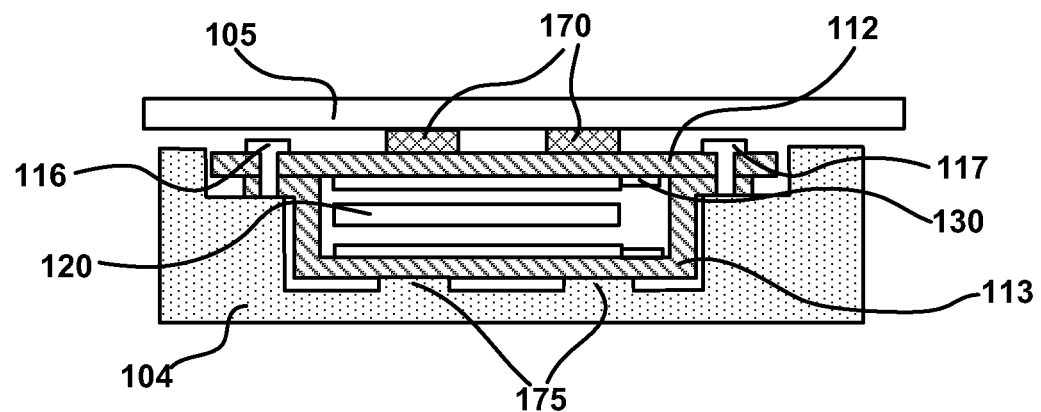

FIG. 8 depicts one embodiment of HDD 100 along A-A' in FIG. 1. FIG. 8 depicts top bosses 170 and bottom bosses 175. Top bosses 170 are disposed between top cover 105 and top yoke 112. Bottom bosses 175 are disposed between base 104 and bottom yoke 113.

In various embodiments top bosses 170 and bottom bosses 175 are made of rubber (e.g., same material as used for gasket (not shown) between base 104 and top cover 105). Both ends of bottom yoke 113 are fixed by screws 116 and 117. The bottom surface bottom yoke 113 is fixed by bottom bosses 175. Therefore, vibrations can be adequately reduced with only first damper plate 113.

Moreover, the reaction force produced by vibration of actuator coil 120 on top yoke 112 is absorbed to some extent by top bosses 170 provided on top cover 105.

Various embodiments of the present invention are thus described. While the present invention has been described in particular embodiments, it should be appreciated that the present invention should not be construed as limited by such embodiments, but rather construed according to the following claims.

The invention claimed is:

1. A hard disk drive comprising:
   a plurality of magnetic disks; and
   a voice coil motor comprising:
      a top yoke and a bottom yoke
      a coil;
      a first damper plate disposed between said top yoke and said bottom yoke for dampening vibrations in said voice coil motor generated by said coil, wherein said first damper plate comprises a prosection that protrudes beyond a periphery of said top yoke, wherein said first damper plate comprises:
         an adhesive material for adhering said first damper plate to a surface of said top yoke that faces said bottom yoke.

2. The hard disk drive of claim 1, wherein said first damper plate is disposed adjacent said top yoke.

3. The hard disk drive of claim 1, wherein said voice coil motor further comprises:
   a first magnet disposed adjacent said top yoke, wherein said first damper plate is disposed coplanar with said first magnet.

4. The hard disk drive of claim 1, wherein said voice coil motor further comprises:
   a second damper plate for dampening vibrations generated by said coil; and
   wherein said second damper plate is disposed adjacent said bottom yoke.

5. The hard disk drive of claim 4, wherein said voice coil motor further comprises:
   a second magnet disposed adjacent said bottom yoke, wherein said second damper plate is disposed coplanar with said second magnet.

6. The hard disk drive of claim 4, wherein said second damper plate comprises:
   an adhesive material for adhering said second damper plate to said bottom yoke.

7. The hard disk drive of claim 4, wherein said second damper plate comprises:
   a projection that protrudes beyond a periphery of said bottom yoke.

8. The hard disk drive of claim 4, wherein said first damper plate and said second damper plate are rigid.

9. A voice coil motor comprising:
   a top yoke;
   a bottom yoke
   a coil;
   a first magnet disposed adjacent said top yoke;
   a second magnet disposed adjacent said bottom yoke;
   a first damper plate for dampening vibrations generated by said coil, wherein said first damper plate is disposed within said voice coil motor coplanar with said first magnet and between said top yoke and said bottom yoke; and a second damper plate for dampening vibrations generated by said coil, wherein said second damper plate is disposed within said voice coil motor coplanar with said second magnet.

* * * * *

UNITED STATES PATENT AND TRADEMARK OFFICE
CERTIFICATE OF CORRECTION

PATENT NO. : 8,767,353 B2  
APPLICATION NO. : 12/980125  
DATED : July 1, 2014  
INVENTOR(S) : Kimihiko Sudo et al.

It is certified that error appears in the above-identified patent and that said Letters Patent is hereby corrected as shown below:

In the Claims

Column 4, Claim 1, Line 23, Delete: "prosection"

Insert: --projection--

Signed and Sealed this  
Fourteenth Day of April, 2015

Michelle K. Lee  
*Director of the United States Patent and Trademark Office*